US012146617B1

(12) United States Patent
Eyssallenne

(10) Patent No.: US 12,146,617 B1
(45) Date of Patent: Nov. 19, 2024

(54) SYSTEMS AND METHODS FOR RECHARGING LIQUID GAS FIRE EXTINGUISHERS

(71) Applicant: Richard Eyssallenne, Yorba Linda, CA (US)

(72) Inventor: Richard Eyssallenne, Yorba Linda, CA (US)

( * ) Notice: Subject to any disclaimer, the term of this patent is extended or adjusted under 35 U.S.C. 154(b) by 65 days.

(21) Appl. No.: 18/135,415

(22) Filed: Apr. 17, 2023

(51) Int. Cl.
*F17C 5/02* (2006.01)
*A62C 13/76* (2006.01)

(52) U.S. Cl.
CPC ................ *F17C 5/02* (2013.01); *A62C 13/76* (2013.01); *F17C 2201/0104* (2013.01); *F17C 2201/032* (2013.01); *F17C 2201/058* (2013.01); *F17C 2203/0646* (2013.01); *F17C 2205/0107* (2013.01); *F17C 2205/0329* (2013.01); *F17C 2221/014* (2013.01); *F17C 2223/013* (2013.01); *F17C 2223/035* (2013.01); *F17C 2250/0421* (2013.01); *F17C 2250/043* (2013.01); *F17C 2270/0754* (2013.01)

(58) Field of Classification Search
CPC ................ F17C 5/02; F17C 2201/0104; F17C 2201/032; F17C 2201/058; F17C 2203/0646; F17C 2205/0107; F17C 2205/0329; F17C 2221/014; F17C 2223/013; F17C 2223/035; F17C 2250/0421; F17C 2250/043; F17C 2270/0754; A62C 13/76
USPC .............................................................. 141/3
See application file for complete search history.

(56) References Cited

U.S. PATENT DOCUMENTS

| | | | | | |
|---|---|---|---|---|---|
| 2,291,288 | A * | 7/1942 | Rudd | F17C 5/06 141/105 |
| 3,875,980 | A * | 4/1975 | Getz | B65B 1/16 141/286 |
| 4,053,001 | A * | 10/1977 | Healey | A62C 13/76 141/2 |
| 2013/0305745 | A1 * | 11/2013 | Drube | F17C 7/02 62/50.7 |

(Continued)

FOREIGN PATENT DOCUMENTS

| | | | | | |
|---|---|---|---|---|---|
| CN | 109185692 | A | * 1/2019 | A62C 13/00 |
| CN | 110778912 | A | * 2/2020 | A62C 13/76 |
| JP | 2010273964 | A | * 12/2010 | |

OTHER PUBLICATIONS

CN 110778912 A—English Translation (Year: 2020).*
CN 109185692 A—English Translation (Year: 2019).*
JP 2010273964 A English Translation (Year: 2010).*

*Primary Examiner* — Craig M Schneider
*Assistant Examiner* — Christopher M Afful

(57) ABSTRACT

Systems and methods for recharging a fire extinguisher are disclosed. The systems include a rigid frame to which a tank is affixed, with the tank being configured to hold pressurized inert gas. The systems include an inlet fill hose that includes a first ball valve and a second ball valve, with a proximal end of the inlet fill hose being fluidly connected to the tank and a distal end of the inlet fill hose being configured to be fluidly connected to a fire extinguisher. The systems further include an inert gas inlet port that is fluidly connected to the tank and includes a third ball valve, and an inert gas outlet port that is fluidly connected to the tank and includes a fourth ball valve. The systems also include a pressure gauge that is operably connected to the tank.

10 Claims, 4 Drawing Sheets

(56) References Cited

U.S. PATENT DOCUMENTS

2020/0038699 A1* 2/2020 Broughton ............. A62C 13/62

* cited by examiner

SYSTEMS AND METHODS FOR RECHARGING LIQUID GAS FIRE EXTINGUISHERS

FIELD OF THE INVENTION

The field of the present invention relates to systems and methods that can be used to recharge liquid gas fire extinguishers.

BACKGROUND OF THE INVENTION

Many portable fire extinguishers are pressurized with nitrogen gas, with such gas being effective to propel a stream of fire-squelching agents onto the base of a fire. The fire-squelching agents may include halocarbons (Halons) that are effective to extinguish a fire. In some extinguishers, the pressurized nitrogen also serves as a fire-squelching agent (in addition to serving as the propellant).

Fire extinguisher recharging equipment are known in the art. However, currently-available recharging systems are often not portable, nor are such systems easy to operate in uncontrolled environments. Accordingly, there is a continuing need for improved fire extinguisher recharging systems that are portable, and easy to use and operate within uncontrolled environments.

As described further below, the present invention addresses many of these needs for improved fire extinguisher recharging systems.

SUMMARY OF THE INVENTION

According to certain aspects of the present invention, systems for recharging a fire extinguisher are provided. The systems of the present invention include a rigid frame that is configured to be positioned on a ground surface. The rigid frame supports and houses a tank that is affixed to the rigid frame, with the tank being configured to hold pressurized inert gas (such as nitrogen gas). The invention provides that, in certain preferred embodiments, the tank is affixed to the rigid frame such that the tank is positioned and suspended above the ground surface. The systems further include an inlet fill hose that includes a first ball valve and a second ball valve. The proximal end of the inlet fill hose is fluidly connected to a bottom surface of the tank, while a distal end of the inlet fill hose is configured to be fluidly connected to a fire extinguisher. The system is configured to deliver pressurized inert gas to the fire extinguisher when the inlet fill hose is fluidly connected to the fire extinguisher and the first ball valve and the second ball valve are manually opened.

According to such aspects of the invention, the systems further include an inert gas inlet port that is fluidly connected to a side surface of the tank and includes a third ball valve. The tank is configured to receive additional pressurized inert gas from an external source when the inert gas inlet port is fluidly connected to the external source and the third ball valve is manually opened. Still further, the systems include an inert gas outlet port that is fluidly connected to a top surface of the tank and includes a fourth ball valve and an exhaust silencer. The inert gas outlet port is configured to discharge inert gas from the tank when the fourth ball valve is manually opened. The systems also include a pressure gauge that is operably connected to the tank.

According to additional aspects of the present invention, methods for recharging a fire extinguisher using the systems described herein are provided. Such methods include the steps of placing the fire extinguisher on a scale; fluidly connecting the inlet fill hose to the fire extinguisher; opening the first ball valve; holding the discharge handle of the fire extinguisher in an open position; and gradually opening the second ball valve, thereby causing pressurized inert gas to travel from the tank and into the fire extinguisher. Once the fire extinguisher includes a target amount of pressurized inert gas as shown by a weight measurement on the scale, the second ball valve and the first ball valve are closed. The inlet fill hose may then be disconnected from the fire extinguisher.

According to such aspects of the invention, the methods may further involve supplying the tank with additional pressurized inert gas, if necessary to achieve the desired target amount of pressurized inert gas in a fire extinguisher. Such methods include the steps of providing additional pressurized inert gas to the tank by fluidly connecting the inert gas inlet port to an external source of pressurized inert gas and opening the third ball valve; monitoring the pressure gauge and closing the third ball valve when the tank contains a desired amount of pressurized inert gas as shown by the pressure gauge; and, if necessary to provide the fire extinguisher with the target amount of pressurized inert gas, repeating the steps described above to provide additional pressurized gas to the fire extinguisher.

Such aspects of the invention may further include emptying the fire extinguisher prior to filling the fire extinguisher with the target amount of pressurized inert gas. According to such methods, the fire extinguisher may be emptied by first ensuring that the tank described herein is empty (or almost empty); closing the first ball valve, second ball valve, third ball valve, and fourth ball valve; fluidly connecting the inlet fill hose to the fire extinguisher; opening the first ball valve and opening the second ball valve; holding the discharge handle of the fire extinguisher in the open position to discharge the fire extinguisher; closing the second ball valve and disconnecting the fire extinguisher from the inlet fill hose; and discharging any remaining inert gas within the fire extinguisher into a surrounding atmosphere.

The above-mentioned and additional features of the present invention are further illustrated in the Detailed Description contained herein.

DETAILED DESCRIPTION OF THE INVENTION

Figure 1:
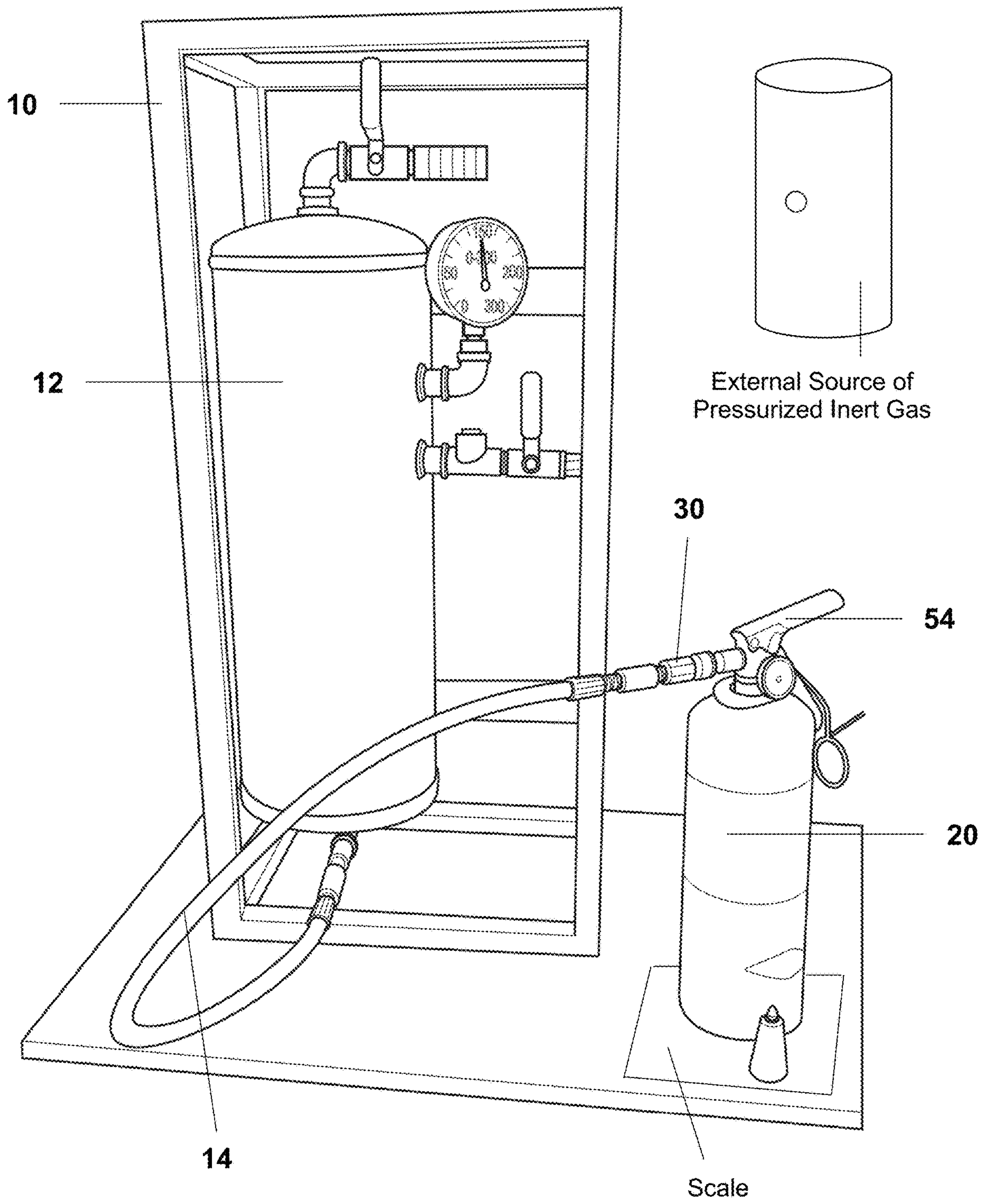
FIG. 1: a front side view of the fire extinguisher recharging system described herein, which is operably connected to a fire extinguisher.

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-4, according to certain preferred embodiments of the present invention, systems for recharging a fire extinguisher are provided. The systems of the present invention include a rigid frame 10 that is configured to be positioned on a ground surface. The rigid frame 10 may be comprised of steel, aluminum, or other suitably rigid and supportive materials. The rigid frame 10 may exhibit any dimension and geometry that is sufficient to hold and support the tank 12 described herein. The rigid frame 10 supports, houses, and is connected to such tank 12 through welding and/or mechanical attachments. In certain preferred embodiments, the invention provides that the tank 12 is affixed to the rigid frame 10 such that the tank 12 is positioned and suspended above the ground surface. As described herein, the tank 12 is configured to hold and dispense pressurized inert gas. The tank 12 may exhibit different sizes and geometries; however, in certain embodiments, the tank 12 is a 7.5-gallon aluminum tank, which can hold pressurized inert gas (such as nitrogen) up to 250 PSI (pounds per square inch).

The systems further include an inlet fill hose 14 that includes a first ball valve 16 and second ball valve 18. The proximal end of the inlet fill hose 14 is fluidly connected to the tank 12, while the distal end of the inlet fill hose 14 is configured to be fluidly connected to a fire extinguisher 20. More particularly, in certain non-limiting embodiments, the proximal end of the inlet fill hose 14 is fluidly connected to a bottom surface of the tank 12 through one or more threaded tubes 22,24,26 that are configured to be attached to each other, and to the inlet fill hose 14, through correspondingly (male/female) threaded ends. The ball valves described herein, such as the first ball valve 16 and second ball valve 18, include a gas/liquid flow control device that includes a pivoting ball having a hole within it, such that the valve allows pressurized inert gas to flow when the hole is turned in line with the flow outlet/inlet—and closed when it is turned by about 90-degrees through the attached handle (such that the hole is no longer turned in line with the flow outlet/inlet).

The invention provides that the distal end of the inlet fill hose 14 is configured to be fluidly connected to a fire extinguisher 20. During use of the systems described herein, the invention provides that the fire extinguisher 20 discharge hose should be removed from the fire extinguisher 20. The distal end of the inlet fill hose 14 can then be fluidly connected to the fire extinguisher 20. The invention provides that a recharge adapter 30 may be used to connect the inlet fill hose 14 to the fire extinguisher 20. In such embodiments, the recharge adapter 30 will include a first threaded aperture (on a right side of the adapter 30) that is configured to be attached to a correspondingly threaded port on the fire extinguisher 20 and a second threaded aperture (on a left side of the adapter 30) that is configured to be attached to a correspondingly threaded distal end of the inlet fill hose 14. The invention provides that the system is configured to deliver pressurized inert gas to the fire extinguisher 20 when the inlet fill hose 14 is fluidly connected to the fire extinguisher 20 and the first ball valve 16 and the second ball valve 18 are manually opened, i.e., the inert gas will flow from the tank 12 (a high pressure environment) and into the fire extinguisher 20 (a lower pressure environment, relative to the pressure of the inert gas within the tank 12).

Figure 2:
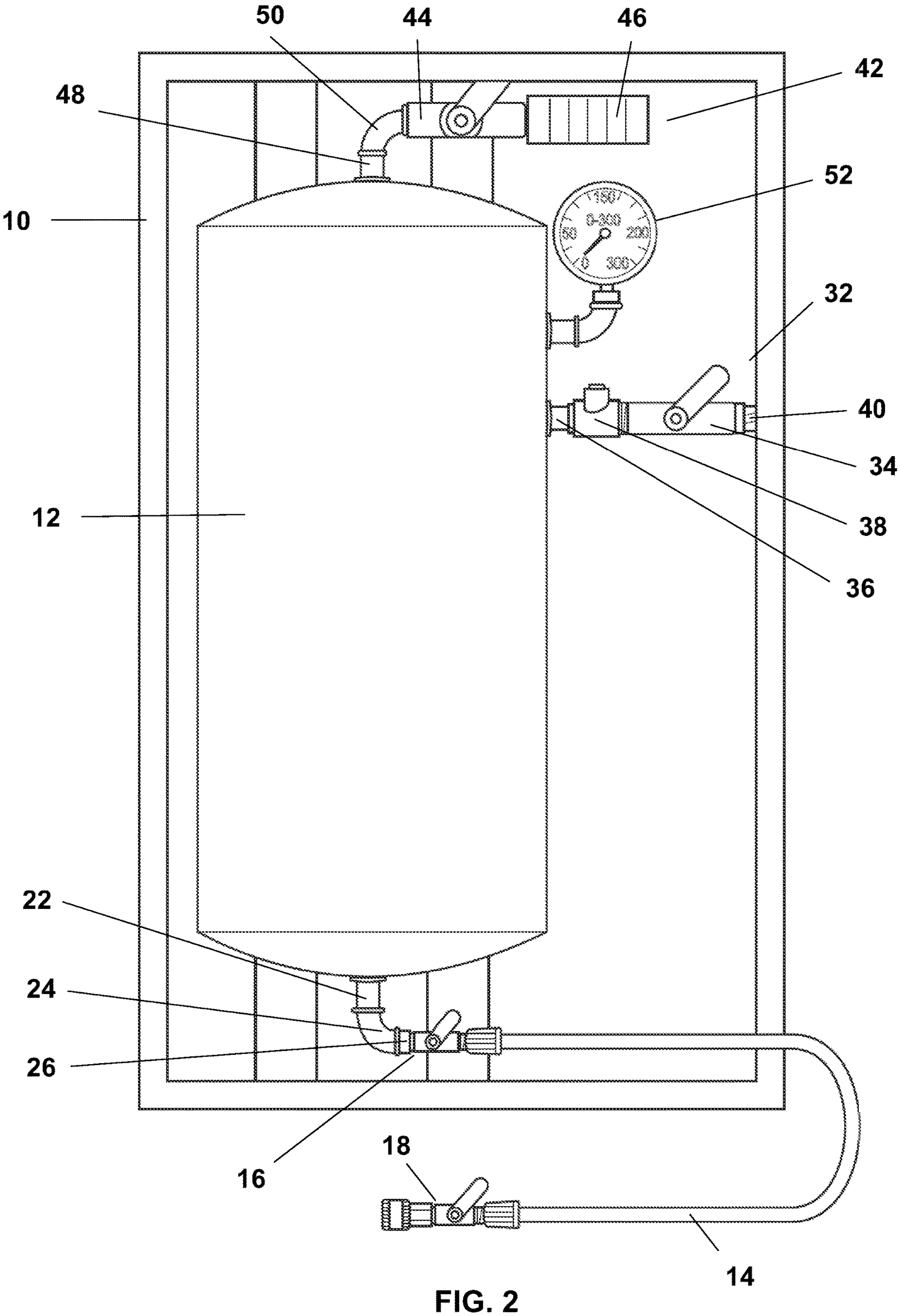
FIG. 2: a diagram showing a side view of the fire extinguisher recharging system described herein.
Figure 3:
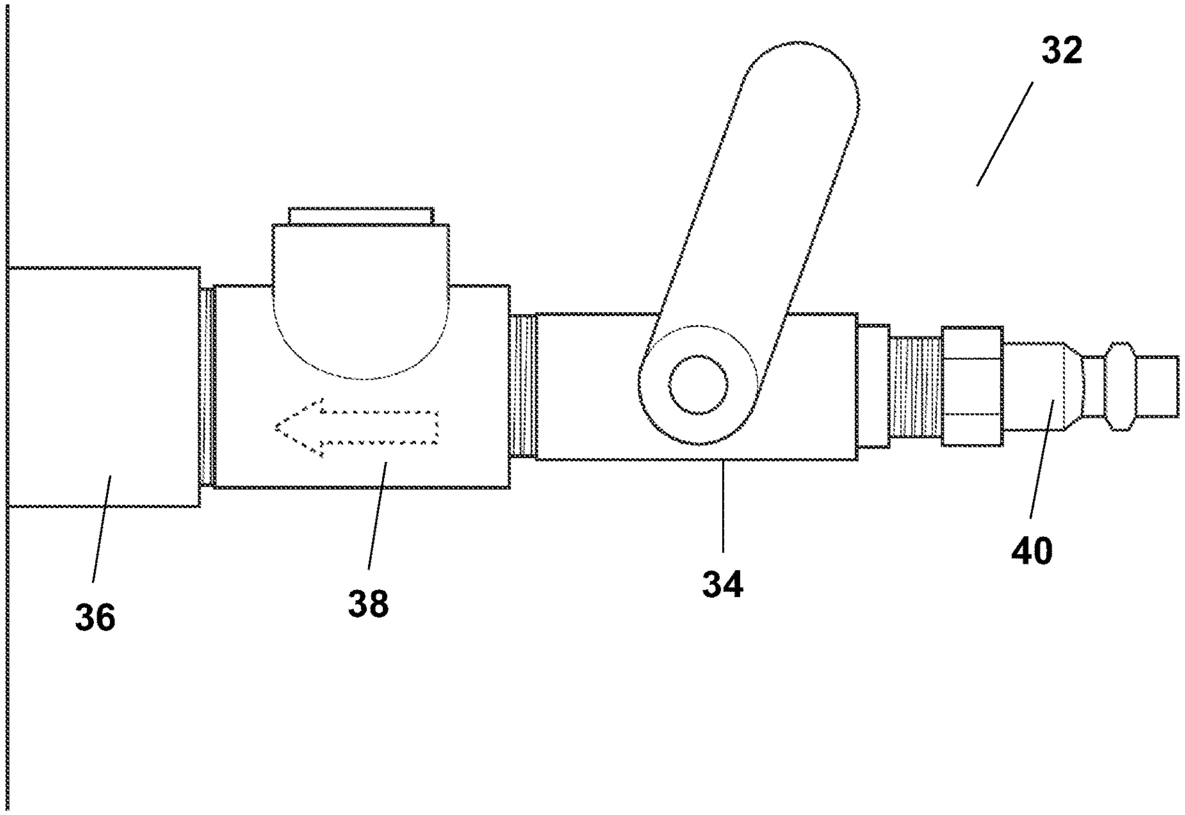
FIG. 3: a diagram showing the inert gas fill inlet port described herein.

According to such aspects of the invention, the systems further include an inert gas inlet port 32 that is fluidly connected to a surface of the tank 12 and includes a third ball valve 34 (FIGS. 2 and 3). More specifically, in certain non-limiting embodiments, the inert gas inlet port 32 may be fluidly connected to a side surface of the tank 12 through a series of interconnected/threaded tubes. For example, the inert gas inlet port 32 may include a tube/nipple 36 fluidly connected to the tank 12, which is fluidly connected to a brass swing check valve 38, which is fluidly connected to the third ball valve 34, which is fluidly connected to a terminal port 40 that is configured to be fluidly connected to an external source of inert gas (such as pressurized nitrogen, carbon dioxide, or other inert gasses). The invention provides that such tube/nipple 36, a brass swing check valve 38, third ball valve 34, and terminal port 40 may be fluidly connected to each other through correspondingly threaded male and female ends. According to such embodiments, the invention provides that the tank 12 is configured to receive additional pressurized inert gas from an external source when the inert gas inlet port 32 is fluidly connected to the external source (through the terminal port 40) and the third ball valve 34 is manually opened. The invention provides that the brass swing check valve 38 is configured to prevent unwanted backflow of inert gas from the tank 12 and back into the external source of inert gas.

Still further, according to certain preferred embodiments of the present invention, the systems include an inert gas outlet port 42 that is fluidly connected to the tank 12, such as the top surface of the tank 12. The inert gas outlet port 42 includes a fourth ball valve 44 and an exhaust silencer 46, e.g., a Parker ES50MC aluminum exhaust silencer. More particularly, the invention provides that the inert gas outlet port 42 may include one or more tubes 48,50 that are fluidly connected to the tank 12, which are fluidly connected to the fourth ball valve 44, which is fluidly connected to the exhaust silencer 46. The invention provides that such tubes 48,50, fourth ball valve 44, and exhaust silencer 46 may be fluidly connected to each other through correspondingly threaded male and female ends. The invention provides that the inert gas outlet port 42 is configured to discharge inert gas from the tank 12 when the fourth ball valve 44 is manually opened—as necessary to reduce the amount of pressurized inert gas contained within the tank 12. The systems also include a pressure gauge 52 that is operably connected to the tank 12, such that the amount of pressurized inert gas within the tank 12 can be monitored.

Figure 4:
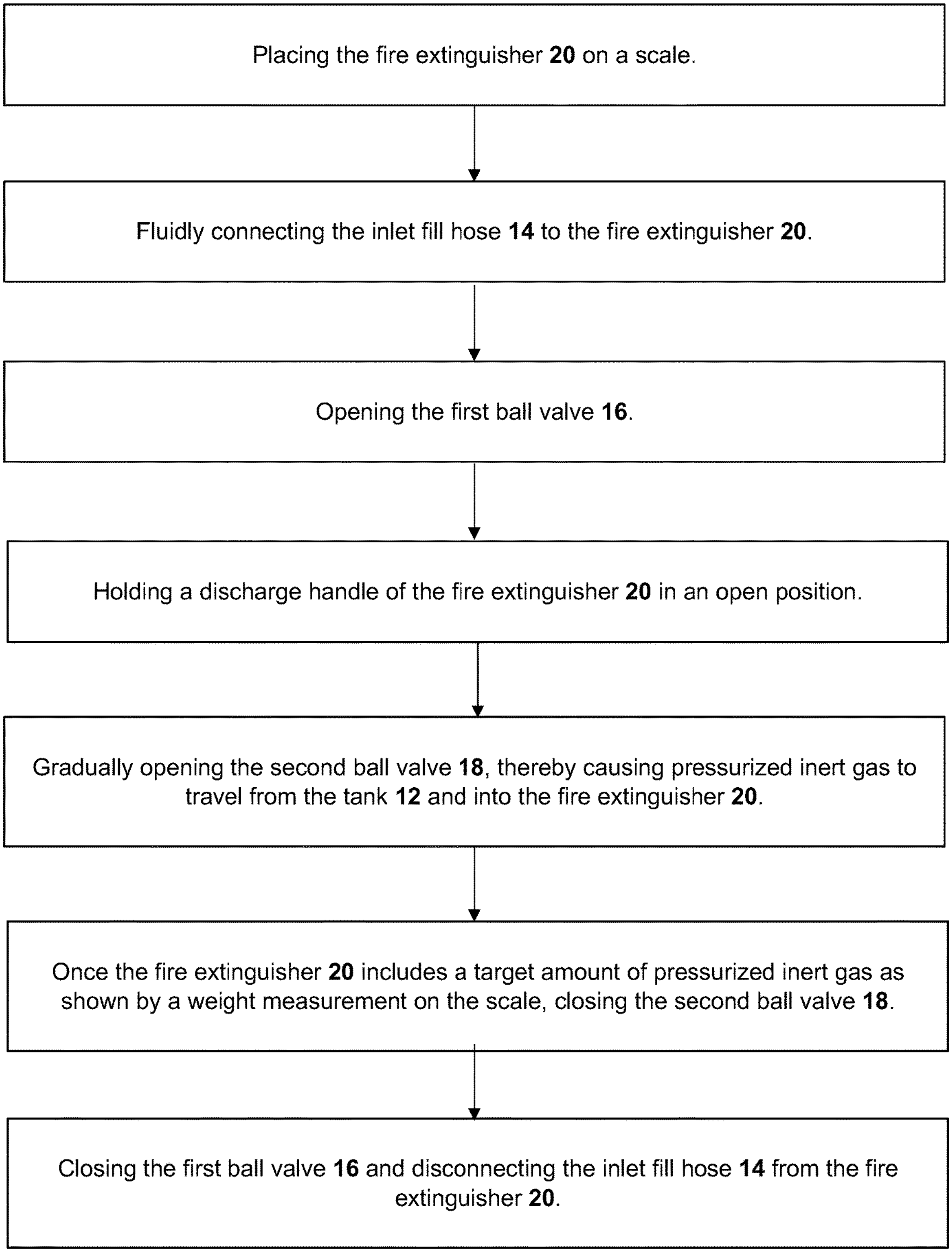
FIG. 4: a flow chart that summarizes the methods for recharging a fire extinguisher, as described herein.

Referring now to FIG. 4, according to additional preferred embodiments of the present invention, methods for recharging a fire extinguisher 20 using the systems described herein are provided. Such methods include the steps of placing the fire extinguisher 20 on a scale; fluidly connecting the inlet fill hose 14 to the fire extinguisher 20; opening the first ball valve 16; holding the discharge handle 54 of the fire extinguisher 20 in an open position; and gradually opening the second ball valve 18, thereby causing pressurized inert gas to travel from the tank 12 and into the fire extinguisher 20. Once the fire extinguisher 20 includes a target amount of pressurized inert gas as shown by a weight measurement on the scale, the second ball valve 18 and the first ball valve 16 are then closed. The inlet fill hose 14 may then be disconnected from the fire extinguisher 20.

According to such embodiments of the invention, the methods may further involve supplying the tank 12 with additional pressurized inert gas, if necessary to achieve the desired target amount of pressurized inert gas within a fire extinguisher 20. Such methods include the steps of providing additional pressurized inert gas to the tank 12 by fluidly connecting the inert gas inlet port 32 to an external source of pressurized inert gas and opening the third ball valve 34. Such methods further include monitoring the pressure gauge 52 and closing the third ball valve 34 when the tank 12 contains a desired amount of pressurized inert gas as shown by the pressure gauge 52. If necessary to provide the fire extinguisher 20 with the target amount of pressurized inert gas, the steps described above to provide additional pressurized gas to the fire extinguisher 20 may be repeated as necessary.

Such embodiments of the invention may further include emptying the fire extinguisher 20 prior to filling the fire extinguisher 20 with the target amount of pressurized inert gas. In such procedures, the tank 12 is emptied and contains no pressurized gas (or otherwise little pressurized gas). According to such methods, the fire extinguisher 20 may be emptied by closing the first ball valve 16, second ball valve 18, third ball valve 34, and fourth ball valve 44. Next, the inlet fill hose 14 is fluidly connected to the fire extinguisher 20 as described herein. The first ball valve 16 and second ball valve 18 are opened. The discharge handle 54 of the fire extinguisher 20 is then manually converted to an open position to discharge and empty the fire extinguisher 20, with its contents being forced into the empty tank 12. Next, the second ball valve 18 is closed and the fire extinguisher 20 is disconnected from the inlet fill hose 14, with any remaining and residual inert gas within the fire extinguisher 20 being manually discharged into the surrounding atmosphere. The foregoing procedures may be repeated as necessary to completely (or substantially) empty the fire extinguisher 20. Once the fire extinguisher 20 is sufficiently emptied, the fire extinguisher 20 may be serviced following procedures known to those of ordinary skill in the art—and subsequently filled with pressured inert gas following the procedures described above.

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A method for recharging a fire extinguisher using a system that includes:

(a) a rigid frame configured to be positioned on a ground surface;

(b) a tank that is affixed to the rigid frame and is configured to hold pressurized inert gas;

(c) an inlet fill hose that includes a first ball valve and a second ball valve, wherein a proximal end of the inlet fill hose is fluidly connected to the tank and a distal end of the inlet fill hose is configured to be fluidly connected to a fire extinguisher;

(d) an inert gas inlet port that is fluidly connected to the tank and includes a third ball valve;

(e) an inert gas outlet port that is fluidly connected to the tank and includes a fourth ball valve; and (f) a pressure gauge that is operably connected to the tank, wherein the method comprises:

(i) first emptying the fire extinguisher prior to filling the fire extinguisher with a target amount of pressurized inert gas, wherein the fire extinguisher is emptied by closing the first ball valve, second ball valve, third ball valve, and fourth ball valve; fluidly connecting the inlet fill hose to the fire extinguisher; opening the first ball valve and opening the second ball valve; holding the discharge handle of the fire extinguisher in the open position to discharge the fire extinguisher; closing the second ball valve and disconnecting the fire extinguisher from the inlet fill hose; and discharging any remaining inert gas within the fire extinguisher into a surrounding atmosphere; and (ii) placing the fire extinguisher on a scale; fluidly connecting the inlet fill hose to the fire extinguisher; opening the first ball valve; holding a discharge handle of the fire extinguisher in an open position; gradually opening the second ball valve, thereby causing pressurized inert gas to travel from the tank and into the fire extinguisher; once the fire extinguisher includes the target amount of pressurized inert gas as shown by a weight measurement on the scale, closing the second ball valve; closing the first ball valve; and disconnecting the inlet fill hose from the fire extinguisher.

2. The method of claim 1, wherein the proximal end of the inlet fill hose is fluidly connected to a bottom surface of the tank that is suspended above the ground surface; the inert gas inlet port is fluidly connected to a side surface of the tank; and the inert gas outlet port is fluidly connected to a top surface of the tank.

3. The method of claim 2, wherein the inert gas outlet port includes an exhaust silencer.

4. The method of claim 1, wherein the tank is affixed to the rigid frame such that the tank is positioned and suspended above the ground surface.

5. The method of claim 1, wherein the system is configured to deliver pressurized inert gas to the fire extinguisher when (a) the inlet fill hose is fluidly connected to the fire extinguisher and (b) the first ball valve and the second ball valve are manually opened.

6. The method of claim 1, wherein the tank is configured to receive additional pressurized inert gas from an external source when (a) the inert gas inlet port is fluidly connected to the external source and (b) the third ball valve is manually opened.

7. The method of claim 1, wherein the inert gas outlet port is configured to discharge inert gas from the tank when the fourth ball valve is manually opened.

8. The method of claim 1, which further comprises:

(a) providing additional pressurized inert gas to the tank by fluidly connecting the inert gas inlet port to an external source of pressurized inert gas and opening the third ball valve;

(b) monitoring the pressure gauge and closing the third ball valve when the tank contains a desired amount of pressurized inert gas as shown by the pressure gauge; and (c) if necessary to provide the fire extinguisher with the target amount of pressurized inert gas, repeating steps of claim 1 (ii).

9. A method for recharging a fire extinguisher using a system for recharging a fire extinguisher that includes, which comprises:

(a) a rigid frame configured to be positioned on a ground surface;

(b) a tank that is affixed to the rigid frame and is configured to hold pressurized inert gas, wherein the tank is affixed to the rigid frame such that the tank is positioned and suspended above the ground surface;

(c) an inlet fill hose that includes a first ball valve and a second ball valve, wherein (i) a proximal end of the inlet fill hose is fluidly connected to a bottom surface of the tank, (ii) a distal end of the inlet fill hose is configured to be fluidly connected to a fire extinguisher, and (iii) the system is configured to deliver pressurized inert gas to the fire extinguisher when the inlet fill hose is fluidly connected to the fire extinguisher and the first ball valve and the second ball valve are manually opened;

(d) an inert gas inlet port that is fluidly connected to a side surface of the tank and includes a third ball valve, wherein the tank is configured to receive additional pressurized inert gas from an external source when (i) the inert gas inlet port is fluidly connected to the external source and (ii) the third ball valve is manually opened;

(e) an inert gas outlet port that is fluidly connected to a top surface of the tank and includes a fourth ball valve and an exhaust silencer, wherein the inert gas outlet port is configured to discharge inert gas from the tank when the fourth ball valve is manually opened; and (f) a pressure gauge that is operably connected to the tank, wherein the method comprises:

(i) first emptying the fire extinguisher prior to filling the fire extinguisher with a target amount of pressurized inert gas, wherein the fire extinguisher is emptied by: closing the first ball valve, second ball valve, third ball valve, and fourth ball valve; fluidly connecting the inlet fill hose to the fire extinguisher; opening the first ball valve and opening the second ball valve; holding the discharge handle of the fire extinguisher in the open position to discharge the fire extinguisher; closing the second ball valve and disconnecting the fire extinguisher from the inlet fill hose; and discharging any remaining inert gas within the fire extinguisher into a surrounding atmosphere; and (ii) placing the fire extinguisher on a scale; fluidly connecting the inlet fill hose to the fire extinguisher; opening the first ball valve; holding a discharge handle of the fire extinguisher in an open position; gradually opening the second ball valve, thereby causing pressurized inert gas to travel from the tank and into the fire extinguisher; once the fire extinguisher includes the target amount of pressurized inert gas as shown by a weight measurement on the scale, closing the second ball valve; closing the first ball valve; and disconnecting the inlet fill hose from the fire extinguisher.

10. The method of claim 9, which further comprises:

(a) providing additional pressurized inert gas to the tank by fluidly connecting the inert gas inlet port to an external source of pressurized inert gas and opening the third ball valve;

(b) monitoring the pressure gauge and closing the third ball valve when the tank contains a desired amount of pressurized inert gas as shown by the pressure gauge; and (c) if necessary to provide the fire extinguisher with the target amount of pressurized inert gas, repeating steps of claim 9 (ii).

* * * * *